June 30, 1942. L. R. HILL 2,288,453
SEPARATING HYDROCARBON FLUIDS
Filed May 18, 1939
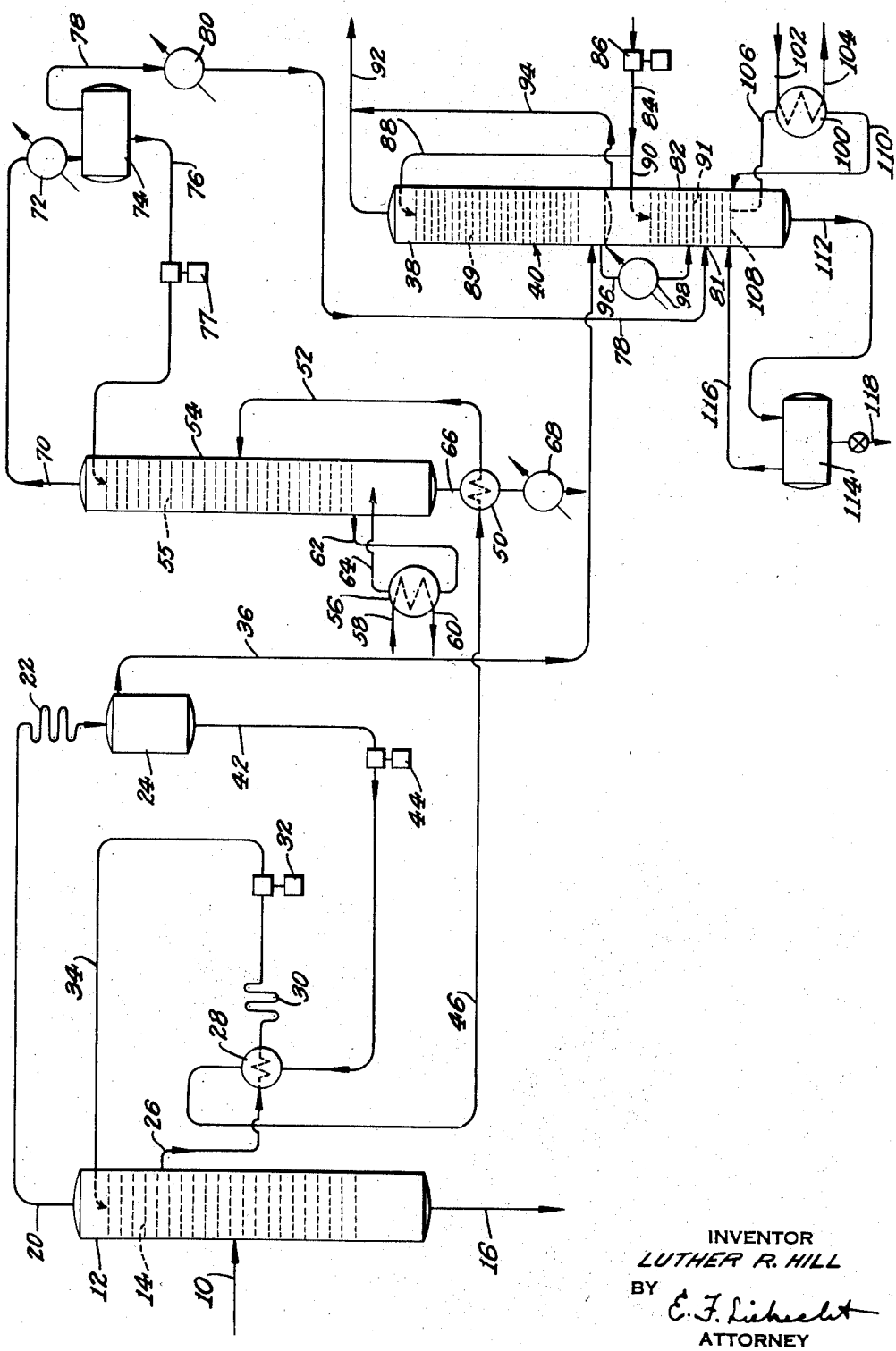
INVENTOR
LUTHER R. HILL
BY
E. F. Lieheelt
ATTORNEY Patented June 30, 1942

2,288,453

UNITED STATES PATENT OFFICE 2,288,453

SEPARATING HYDROCARBON FLUIDS

Luther R. Hill, Radburn, N. J., assignor to The M. W. Kellogg Company, New York, N. Y., a corporation of Delaware Application May 18, 1939, Serial No. 274,339

5 Claims. (Cl. 196—11)

This invention relates to the separation of desired constituents from gaseous mixtures containing hydrocarbons.

In the conversion of higher boiling hydrocarbons to lower boiling hydrocarbons to produce motor fuels such as gasoline, hydrocarbon gases and some hydrogen are also produced. These hydrocarbon gases contain valuable constituents which may be separated and further treated to produce additional quantities of gasoline or motor fuel or they may be used for other purposes. In the separation of normally liquid hydrocarbons such as unstabilized gasoline from gases and in the stabilization of lower boiling hydrocarbons within the gasoline boiling range, gases of different compositions are obtained.

In prior methods oil to be converted to lower boiling liquids such as gasoline, or oil plus hydrocarbon gases such as propane and butane or the like to be converted are passed through a conversion zone at elevated temperature and pressure and maintained therein for a suitable length of time to effect the desired extent of conversion. The products of conversion are introduced into an evaporator under lower pressure to separate vapors from liquid residue. The vapors are fractionated in a fractionating tower or bubble tower to separate condensate oil from lower boiling liquids containing gasoline.

The vapors passing overhead from the bubble tower are cooled to condense normally liquid hydrocarbons containing gasoline and are then passed to a bubble tower separator to separate uncondensed gases from liquid. The liquid is preferably passed to a stabilizer to produce stabilized gasoline by removing undesired volatile constituents. The stabilizer is a fractionating tower and the vapors passing overhead are cooled and passed to a stabilizer separator to separate gases from liquid, the liquid being returned to the stabilizer. Stabilized gasoline is withdrawn from the bottom of the stabilizer.

In previous methods these gases from the bubble tower separator and stabilizer separator were combined and introduced into a single absorber. Due to the difference in the compositions of the gases, either expensive equipment was required or a poor separation and recovery was obtained. Large amounts of absorber liquid have to be pumped. When high percentage recovery of $C_3$ and $C_4$ hydrocarbons is desired in previous methods, a large quantity of lean oil and a large number of absorption trays are necessary in the absorber. Under these conditions, considerable quantities of methane and ethane are absorbed which must be revaporized in the stripping section. The excess heat added to the reboiler must in part be removed in intercoolers on the absorber. Intercoolers are undesirable and expensive.

According to my invention, the largest amount of desirable constituents is recovered from hydrocarbon gases having different compositions without using expensive equipment heretofore required. According to my invention, equipment cost is decreased by using separate absorbers. Bubble tower separator gas contains a relatively large proportion of $C_1$ and $C_2$ hydrocarbons by volume and a smaller proportion of $C_3$ to $C_5$ and higher hydrocarbons by volume and it is desired to selectively absorb all the butane and higher hydrocarbons and a large proportion of the propane while discarding a large part of the $C_1$ and $C_2$ hydrocarbons. This is accomplished in one absorber by using a relatively small amount of absorbent and a large number of trays. Most of the methane and ethane is discarded as unabsorbed gas.

Stabilizer gas contains smaller proportions of $C_1$ and $C_2$ hydrocarbons and larger proportions of $C_3$ and higher hydrocarbons than bubble tower separator gas. Therefore, selective absorption is not necessary to avoid picking up $C_1$ and $C_2$ hydrocarbons because they are present in relatively small amounts. The stabilizer gas is passed to another absorber having a smaller number of trays than the first absorber but a larger amount of absorbent is used. In this way rapid absorption of $C_3$ and higher hydrocarbons is obtained under conditions which do not favor precise separation of $C_1$ and $C_2$ hydrocarbons. For a lean gas, such as bubble tower separator gas or the like, it was found advantageous to increase the number of trays in the absorber and hold absorber liquid to a minimum because this gives a high percentage absorption of propane and butane while the absorption of light ends is low. In other words, a selective absorption is obtained. For a rich gas, such as stabilizer separator gas or the like, where practically total absorption is desirable, it is more advantageous to use a small number of trays in another absorber and a high absorber liquid to gas ratio, since little selectivity is required.

In one example according to my invention, lean gas, such as bubble tower separator gas or the like, containing relatively large percentages of methane and ethane by volume and smaller percentages of $C_3$ and $C_4$ and higher hydrocarbons by volume, is passed to an absorber having a relatively large number of trays and contacted with a minimum amount of a fresh or lean absorber liquid such as naphtha to absorb a large quantity of the $C_4$ and higher hydrocarbons and some of the $C_3$ hydrocarbons, while most of the hydrogen, $C_1$ and $C_2$ hydrocarbons is discarded as unabsorbed gas. The rich oil containing the absorbed constituents is passed to another absorber where it contacts gas from another source as will be presently described.

The liquid separated from the gas as above described and collected in the bubble tower separator contains gasoline constituents. This liquid is heated and passed to a stabilizer for removing undesired volatile constituents from the desired motor fuel such as gasoline to produce a stabilized product. The stabilized motor fuel is withdrawn from the bottom of the stabilizer. Volatile constituents pass overhead from the stabilizer as gases. The gas passing overhead from the stabilizer is relatively free from hydrogen, contains relatively small amounts of methane and ethane and a larger proportion of $C_3$, $C_4$ and higher hydrocarbons. Because of the relatively small proportion of $C_1$ and $C_2$ hydrocarbons in this gas, a less exact absorption may be used to recover desired constituents.

The gas from the stabilizer is introduced into a separate absorber containing a smaller number of trays than the previously described absorber. A fresh or lean absorbent, such as naphtha, is introduced into the upper portion of the last mentioned absorber and a larger quantity of absorbent is used in this absorber than the amount used in the previously described absorber. The gas from the stabilizer introduced into this absorber is also contacted with the enriched absorber liquid leaving the first mentioned absorber. Unabsorbed gas leaves the upper portion of each absorber. A reboiler is preferably used in connection with the stabilizer gas absorber to strip out light constituents from the rich absorber liquid.

The rich liquid from the bottom of the absorber into which the stabilizer gas is introduced contains $C_3$, $C_4$ and higher hydrocarbons absorbed from the bubble tower separator gas and from the stabilizer separator gas. If desired, the absorbed constituents may be separated from the absorber liquid and further treated in any desired manner. In the preferred form of the invention fresh or lean naphtha is used as the absorbing liquid in both absorbers and the rich naphtha containing the absorbed constituents is passed to a heating zone in order to subject the naphtha and absorbed constituents to conversion treatment at elevated temperature and under superatmospheric pressure to produce additional quantities of lower boiling hydrocarbons suitable for use as motor fuel.

Where the naphtha and absorbed constituents are subjected to conversion treatment, the products of conversion may be passed to an evaporator to separate vapors from liquid residue and the vapors are passed to the fractionating tower above described to separate gases from lower boiling hydrocarbons. While I have specifically mentioned bubble tower separator gas and stabilizer separator gas, I am not to be restricted thereto as my invention may be used generally where it is desired to separate desired constituents from lean gases and rich gases.

In the drawing the figure represents a diagrammatic showing of one form of apparatus adapted to be used for carrying out the steps of my process, but other apparatus may be used.

Referring now to the drawing the reference character 10 designates a line for introducing vapors to an intermediate portion of a fractionating tower 12 such as a bubble tower for separating lower boiling hydrocarbons containing gasoline constituents from higher boiling hydrocarbons containing unconverted constituents or the like. The gases passing through line 10 are preferably vapors which are separated from liquid residue in an evaporator into which products of conversion from a conversion unit are introduced. However, other sources of vapors may be used.

The fractionating tower 12 is provided with plates 14. The higher boiling constituents which are unsuitable for use in a motor fuel are withdrawn from the bottom of fractionating tower 12 through line 16 and may be recycled to the evaporator or may be further treated as desired. The vapors separated during the fractionation leave the top of the fractionating tower 12 through line 20 and are passed through a condenser 22 to cool and condense the vapors and the cooled and condensed vapors are introduced into a separator 24 for separating normally liquid hydrocarbons from gases.

To provide reflux from the fractionating tower 12, a portion of the liquid is withdrawn from one of the plates in the upper portion of tower 12 through line 26 and is passed through heat exchanger 28 and cooler 30 by means of pump 32 to cool the withdrawn liquid and the cooled liquid is returned to the upper portion of the fractionating tower 12 through line 34.

The gases separated in separator 24 leave the upper portion of the separator 24 and are passed through line 36 to the lower portion of an absorber 38 forming part of combination absorber-stripper 40 wherein the gases are contacted with an absorber liquid to absorb desired constituents from the gas as will be pointed out hereinafter in greater detail.

The liquid in separator 24 contains gasoline constituents and lighter constituents and it is desirable to stabilize the liquid to produce a stabilized motor fuel. The liquid is withdrawn from the bottom of the separator 24 through line 42 and passed through the heat exchanger 28 by means of pump 44. In the heat exchanger 28 the liquid is heated by indirect contact with reflux liquid passing through line 26 as above described.

The heated liquid is then passed through line 46 and heat exchanger 50 for further heating and then passes through line 52 and is introduced into an intermediate portion of a stabilizer 54. The stabilizer is provided with plates 55 and the liquid is heated and fractionated in the stabilizer 54 to separate undesired volatile constituents from the liquid to provide a stabilized motor fuel. Heat is provided for the bottom portion of the stabilizer 54 by means of a reboiler 56 having an inlet 58 and an outlet 60 for a heating medium. Liquid to be heated is withdrawn from a plate 55 in the lower portion of the stabilizer 54, is passed through reboiler 56 where it is heated and the heated liquid is returned through line 64 to the stabilizer 54 at a lower point than the point of withdrawal of the liquid through line 62.

The stabilized liquid is withdrawn from the bottom of the stabilizer 54 through line 66 and passed through heat exchanger 50 to partly cool the stabilized product. In passing through the heat exchanger 50, the stabilized liquid indirectly contacts the charge passing through lines 46 and 52 to the stabilizer 54. The stabilized product is then preferably passed through an additional cooler 68 for further cooling.

The gases or vapors which are separated from the liquid undergoing stabilization leave the upper portion of the stabilizer 54 through line 70 and are cooled and condensed by passing through condenser 72. The cooled and condensed vapors are introduced into a separator 74 for separating liquids from gases. The liquid is withdrawn from the bottom of the separator 74 and is passed through line 76 by pump 77 and introduced into the upper portion of the stabilizer 54 as reflux liquid.

The separated gases leave the separator 74 through line 78 and are preferably passed through a cooler 80 and are then introduced into an intermediate portion 81 of the absorber and stripper 82 of the combined absorber-stripper 40 wherein they are contacted with an absorber liquid to absorb desired constituents therefrom. While in the drawing I have shown the two absorbers 38 and 82 as being combined in one unit, it is to be expressly understood that the two absorbers may be separate in which case a line is provided for conducting partially enriched absorber liquid from the absorber 38 to the absorber 82.

Absorber liquid is passed through line 84 by pump 86 and a smaller portion of the absorber liquid is passed through line 88 and introduced into the upper portion of absorber 38 for contacting gases introduced into the lower portion of absorber 38, the gases coming from the separator 24. The absorber 38 is provided with a relatively large number of trays 89 in order to effect selective absorption of desired constituents from the gas as will be pointed out hereinafter.

The larger portion of the absorber liquid passing through line 84 is passed through line 90 and is introduced into the upper portion of the lower absorber 82 for contact with gases from the separator 74 associated with the stabilizer 54 for absorbing the desired constituents from the stabilizer gas. The absorber 82 is provided with trays 91 but the number of trays in absorber 82 is smaller than the number of trays in the absorber 38.

The partially enriched absorber liquid accumulating in the lower portion of the absorber 38 is withdrawn therefrom and passed through line 96 and through cooler 98 and the cooled enriched absorber liquid is introduced into an intermediate portion of the lower absorber 82 above the point of introduction of stabilizer gas passing through line 78.

A reboiler 100 is provided for absorber 82 and has an inlet line 102 and outlet line 104 for a heating medium. The reboiler 100 is associated with the lower portion of the lower absorber 82 for heating and stripping out lighter constituents such as methane and ethane from the absorber liquid in the lower portion of absorber 82. The liquid is withdrawn through line 106 from the bottom tray 108 and is passed through reboiler 100 and is returned to the lower portion of absorber 82 through line 110. The partly enriched absorber liquid from absorber 38 which is introduced into the lower absorber 82 contains considerable quantities of methane and ethane and a large percentage of these light hydrocarbons is removed by heating the rich absorber liquid in absorber 82 by means of reboiler 100.

The rich oil or absorber liquid containing absorbed constituents is withdrawn from the lower portion of absorber 82 and passed through line 112 to an accumulator 114. Any gases or vapors which separate in accumulator 114 are returned to the lower portion of the lower absorber 82 through line 116 for further absorption and stripping therein. The liquid with its absorbed constituents is withdrawn from the bottom of accumulator 114 through valved line 118 and may be used as such, as a feed for a conversion unit, or the rich oil with its absorbed constituents may be further treated to separate the absorbed constituents from the absorber liquid. The separated constituents may be further treated as desired and the separated or lean absorber liquid may be returned as fresh absorbent to the combination absorber-stripper 40.

By using separate absorbers, the total amount of absorber liquid that must be pumped is reduced. Also intercoolers are not necessary for absorber 38 and the cooler 98 is sufficient to provide the necessary cooling.

One example for practicing my invention will now be given but it is to be understood that this example is by way of illustration only and my invention is not to be restricted thereto. The vapors which pass through line 10 and are introduced into the fractionating tower 12 comprise vapors which have been separated from products of conversion from a conversion unit wherein naphtha and hydrocarbon gas including $C_3$, $C_4$ and higher hydrocarbons were maintained under conversion conditions. The vapors separated by fractionation leave the top of tower 12, are condensed and cooled and passed to separator 24 to separate unstabilized liquid from gases.

The gas leaving the top of the separator 24 at a temperature of about 100° F. has the following composition:

|  | Per cent by weight | Per cent by volume |
|---|---|---|
| Hydrogen | 0.23 | 3.7 |
| Methane | 17.40 | 33.9 |
| Ethylene | 5.56 | 6.2 |
| Ethane | 21.21 | 22.0 |
| Propylene | 5.41 | 4.0 |
| Propane | 28.30 | 19.9 |
| Butylene | 5.56 | 3.1 |
| Butane | 12.26 | 5.5 |
| Isopentane | 1.62 | 0.7 |
| Pentane (normal) | 1.62 | 0.7 |
| Hexane and heavier | 0.83 | 0.3 |

The amount of gas leaving the separator 24 is 22,544 lbs. per hour. The gas is introduced into the lower portion of the upper absorber 38 and naphtha is introduced into the upper portion of absorber 38. The gas flows upwardly countercurrently to the downflowing liquid and the trays 89 provide means for intimate mixing of the gas and liquid and maximum absorption of desired constituents. The top of the absorber 38 is at a temperature of about 125° F. and the bottom of the absorber 38 is at a temperature of about 150° F. From the above composition it will be seen that the gas is a lean gas and has a relatively high proportion of methane and ethane by volume. Instead of using bubble tower separator gas, other lean gases having a relatively high percentage of methane and ethane may be treated. While the gas contains some propane, the amount is insufficient to justify a high per cent recovery of propane. However, the gas contains appreciable amounts of butane and pentane and it is desired to absorb these higher hydrocarbons in the absorber liquid while at the same time discarding the lower hydrocarbons such as methane and ethane. This selective absorption is obtained in the absorber 38 which contains a relatively large number of trays. In this example the absorber 38 contains twenty-eight trays. In order to effect the selective absorption a large number of trays is used and a relatively small amount of naphtha is used as the absorbing liquid. In this instance about 5,500 gals. per hour of naphtha are introduced into the upper portion of the absorber 38 through line 88. The naphtha used has an A. P. I gravity of about 55° and a molecular weight of about 116.

The unabsorbed gas leaving the upper portion of absorber 38 has approximately the following composition:

|  | Per cent by weight | Per cent by volume |
|---|---|---|
| Hydrogen | 0.4 | 5.1 |
| Methane | 29.2 | 45.1 |
| Ethylene | 8.5 | 7.5 |
| Ethane | 30.0 | 24.6 |
| Propylene | 5.3 | 3.1 |
| Propane | 24.0 | 13.4 |
| Butylene | 1.7 | 0.8 |
| Butane | 0.9 | 0.4 |

About 13,112 pounds of unabsorbed gas leave the upper portion of absorber 38 per hour.

The absorber liquid leaving the lower portion of the absorber 38 contains the following quantities of absorbed hydrocarbons:

|  | Pounds per hour |
|---|---|
| Methane | 166 |
| Ethylene | 168 |
| Ethane | 927 |
| Propylene | 550 |
| Propane | 3,320 |
| Butylene | 1,041 |
| Butane | 2,250 |

The gas leaving the stabilizer separator 74 is at a temperature of about 136° F. and has approximately the following composition:

|  | Per cent by weight | Per cent by volume |
|---|---|---|
| Methane | 5.05 | 10.2 |
| Ethylene | 4.40 | 5.1 |
| Ethane | 2.15 | 23.5 |
| Propylene | 8.80 | 6.8 |
| Propane | 48.35 | 36.7 |
| Butylene | 10.20 | 5.9 |
| Butane | 21.05 | 11.8 |

From the above composition of the gas from the stabilizer separator it will be seen that this gas has a relatively small percentage of the lower molecular weight hydrocarbons such as methane and ethane and that the gas is relatively rich in propane and butane. Because it is not necessary to remove large quantities of lower molecular weight hydrocarbons such as methane and ethane and because it is not necessary to selectively absorb certain higher hydrocarbon constituents, this gas is introduced into the separator absorber 82 for a different absorption treatment.

The lower absorber 82 has a smaller number of trays than the absorber 38 and in this instance has twelve trays. Because it is not necessary to selectively absorb certain constituents from this gas, a smaller number of trays is used than was used in the absorber 38 but a larger amount of absorber liquid is used in absorber 82 than in absorber 38. About 6,740 gals. per hour of naphtha are introduced into the upper portion of the lower absorber 82 through line 90. In addition the partly enriched absorber liquid (about 5,500 gals. per hour) from absorber 38 is introduced into an intermediate portion of lower absorber 82 above the point of introduction of the stabilizer gas. The stabilizer gas passes upwardly in countercurrent flow to the downwardly flowing fresh naphtha introduced into the upper portion of absorber 82 and to the downwardly flowing partly enriched naphtha from absorber 38. The partly enriched naphtha after passing through cooler 98 is at a temperature of about 95° F. The absorber 38 is maintained at a pressure of about 185 lbs. per square inch.

The composition of the unabsorbed gas leaving the upper portion of the lower absorber 82 is approximately as follows:

|  | Per cent by weight | Per cent by volume |
|---|---|---|
| Methane | 8.76 | 18.0 |
| Ethylene | 6.78 | 7.8 |
| Ethane | 40.21 | 43.1 |
| Propylene | 5.75 | 4.4 |
| Propane | 30.45 | 22.2 |
| Butylene | 1.74 | 1.0 |
| Butane | 6.31 | 3.5 |

The amount of stabilizer gas going into the lower section of the absorber 82 is about 28,450 lbs. per hour. The amount of gas leaving the upper portion of the lower absorber 82 is about 6,520 lbs. per hour. The hydrocarbons absorbed in the rich oil leaving the lower absorber 82 are as follows:

|  | Pounds per hour |
|---|---|
| Methane | 24 |
| Ethylene | 216 |
| Ethane | 106 |
| Propylene | 188 |
| Propane | 11,650 |
| Butylene | 4,580 |
| Butane | 10,940 |
| Pentane | 915 |

The bottom of the absorber 82 is at a temperature of about 200° F. and the top of the absorber 82 is at a temperature of about 160° F. The pressure in absorber 82 is maintained at about 185 lbs. per square inch.

In the drawing I have shown fractionating tower 12 and stabilizer 54 to include a specific example of apparatus whereby lean and rich gases may be obtained, but my invention including the separate absorbers is useful for treating lean and rich gases from other sources where it is desired to recover a high percentage of $C_3$ and higher hydrocarbons.

A further advantage of using separate absorbers is that the fractionation and stabilization systems may be maintained under different pressures, if desired, and permitting greater latitude in the choice of absorption conditions.

Instead of using stabilizer separator gas, rich gases from other sources may be used.

While I have shown one form of apparatus and have given one example of my invention it is to be understood that these are by way of illustration only and that various changes and modifications may be made without departing from the spirit of my invention.

I claim:

1. A method of enriching a hydrocarbon oil with $C_3$ and $C_4$ hydrocarbons derived from a lean gas and a rich gas, including the steps of subjecting said lean gas containing a substantially greater proportion of hydrocarbons lighter than $C_3$ than said rich gas to relatively prolonged countercurrent contact with a first portion of said hydrocarbon oil to selectively absorb $C_3$ and $C_4$ hydrocarbons therein, subjecting said rich gas containing a greater proportion of $C_3$ and $C_4$ hydrocarbons than said lean gas to relatively brief countercurrent contact with a second portion of said hydrocarbon oil to non-selectively absorb $C_3$ and $C_4$ hydrocarbons therein, proportioning said first and second portions so that the mol ratio of liquid to gas in said non-selective absorption is substantially greater than in said selective absorption, rejecting unabsorbed hydrocarbons, and combining said first and second portions to form a $C_3$—$C_4$ enriched hydrocarbon oil containing a minimum quantity of hydrocarbons lighter than $C_3$.

2. A method as in claim 1 including the step of combining said first portion of said hydrocarbon oil with said second portion after said first portion has contacted said lean gas but before said second portion has completed its contact with said rich gas.

3. A method as in claim 1 including the steps of heating said $C_3$—$C_4$ enriched hydrocarbon oil to vaporize and distill off hydrocarbons lighter than $C_3$, and combining the evolved vapors with said rich gas prior to said non-selective absorption step.

4. A method as in claim 1 including the steps of combining said first portion of said hydrocarbon oil with said second portion after said first portion has contacted said lean gas but before said second portion has completed its relatively brief countercurrent contact with said rich gas, heating said combined first and second portions after completion of said brief contact to vaporize and distill off hydrocarbons lighter than $C_3$, and combining the evolved vapors with rich gas about to be subjected to said relatively brief countercurrent contact with said second portion of hydrocarbon oil.

5. In a process for the pyrolytic conversion of a hydrocarbon oil having normally gaseous hydrocarbons dissolved therein, the steps comprising dividing a stream of hydrocarbon oil into a first portion and a second portion, using said first portion to absorb $C_3$ and $C_4$ hydrocarbons relatively selectively from a lean gas, using said second portion to absorb $C_3$ and $C_4$ hydrocarbons relatively unselectively from a rich gas, said lean gas containing a substantially greater proportion of hydrocarbons lighter than $C_3$ than said rich gas, proportioning said first and second portions so that the mol ratio of liquid to gas in said unselective absorption is substantially greater than in said selective absorption, rejecting unabsorbed components of said rich gas and said lean gas, combining said first and second portions to form a $C_3$—$C_4$ enriched hydrocarbon oil, heating said enriched oil to vaporize and distill off hydrocarbons lighter than $C_3$, combining the thus evolved vapors with rich gas about to be subjected to said unselective absorption step, withdrawing enriched hydrocarbon oil from said heating step and subjecting it to pyrolytic conversion to form desired hydrocarbons of the gasoline type, passing conversion products to a fractionating zone, withdrawing a fraction comprising gasoline-like hydrocarbons and $C_4$ and lighter hydrocarbons from said zone, separating said fraction into an unstabilized gasoline and a lean gas, using said lean gas in the process as previously described, fractionating said unstabilized gasoline into a stabilized gasoline and a rich gas, and using said rich gas in the process as previously described.

LUTHER R. HILL.